Patented Aug. 21, 1923.

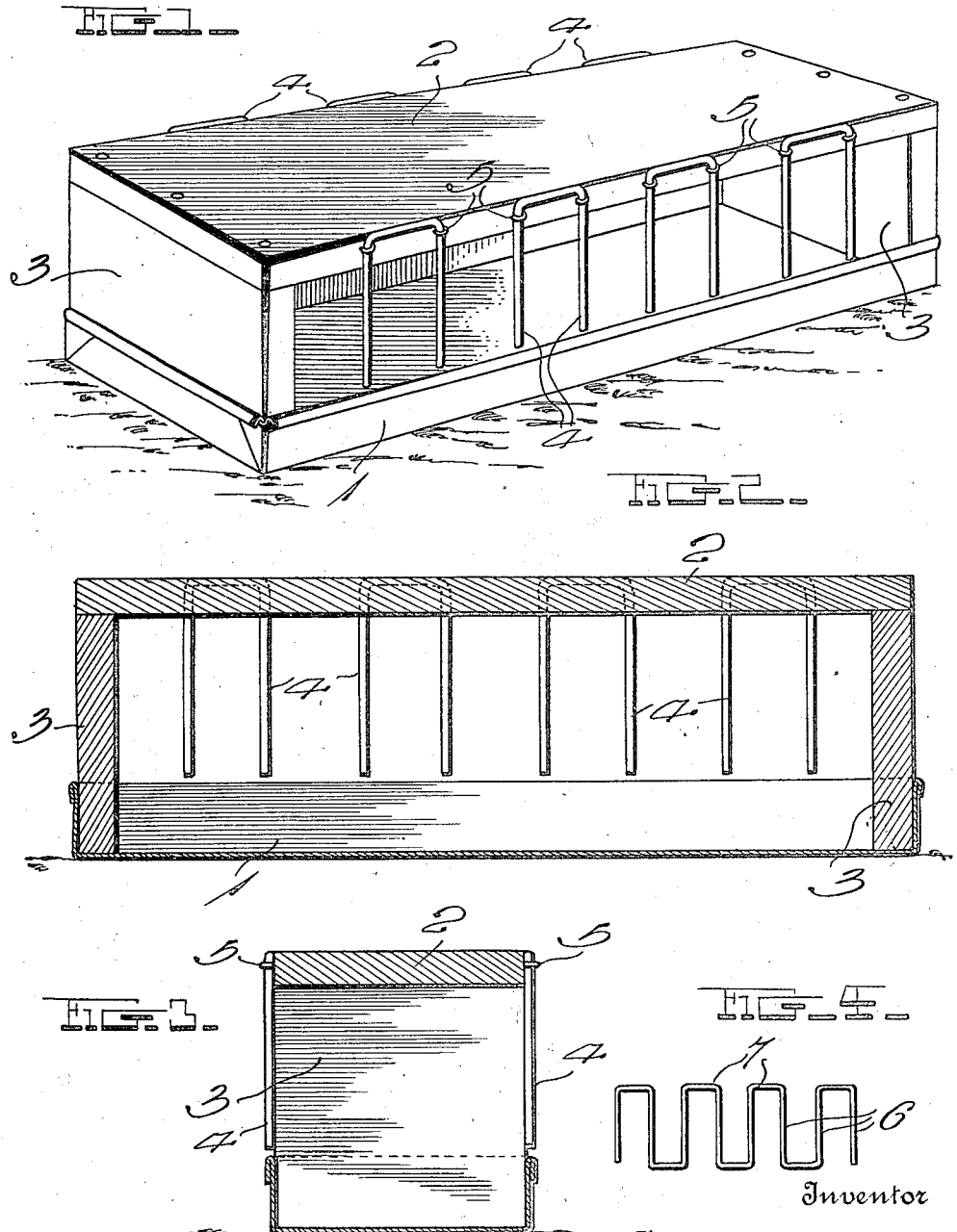

1,465,327

UNITED STATES PATENT OFFICE.

GEORGE H. ALLEN, OF CLINTON, NEW YORK.

CHICKEN FEEDER.

Application filed August 23, 1922. Serial No. 583,744.

*To all whom it may concern:*

Be it known that I, GEORGE HOYT ALLEN, a citizen of the United States, residing at Clinton, in the county of Oneida and State of New York, have invented certain new and useful Improvements in Chicken Feeders; and I do declare the following to be a full, clear, and exact description of the invention, such as will enable others skilled in the art to which it appertains to make and use the same.

This invention relates to an improved chicken feeder for use in feeding small chickens and will be principally used for feeding sour milk, but of course may be used for feeding dry feed.

One object of the invention is to provide a chicken feeder which will be of a simple construction and include a pan and a cover fitting into the pan and serving as a shield for the pan and further serving as a carrier for guards which will permit the chickens to have ready access to the sour milk in the pan but prevent them from stepping into the pan.

Another object of the invention is to so construct the cover that it may fit snugly into the pan and extend entirely over the open top of the pan, the cover preventing chickens from roosting upon the cover and dropping dirt into the pan.

Another object of the invention is to so construct this cover that the depending end walls thereof may fit snugly in the end portions of the pan and be held therein by friction thus providing a firm cover which can be readily put in place or removed and which will be firmly held in place when in the operative position.

Another object of the invention is to provide a feeder which will be cheap to produce, easy to put together and take apart and easy to keep clean.

This invention is illustrated in the accompanying drawngs, wherein:

Figure 1 is perspective view of the improved feeder.

Figure 2 is a longitudinal vertical sectional view through the feeder.

Figure 3 is a transverse sectional view through the feeder.

Figure 4 is a view showing a modified form of guard.

This improved feeder is designed to overcome objections found in connection with feeders already in use. In feeders now in use, it has been found that the chickens have a tendency to rest upon the top of the feeder and thus drop dirt into the pan and it has been further found that in feeders now in use, the chickens in some instances cannot reach all of the food placed in the pan and therefore part of the food is not consumed and it is thus wasted. It has been further found that the feeders now in use cannot be readily taken apart for cleaning and that after they have been used for some time, they cannot be readily assembled on account of becoming somewhat bent by rough usage. It has also been found that with the feeders now in use, the chemical reaction which takes place in a pan formed of galvanized iron will cause the sour milk to be spoiled and thus rendered unfit for consumption by the chickens. The pan 1 which is made use of in this feeder is formed of aluminum and as shown is rectangular in shape and preferably oblong. This pan is of sufficient length to permit a number of chickens to feed at one time and of such a width that chickens feeding at one side of the pan can reach well beyond the center portion thereof. Therefore the chickens can readily reach all of the contents of the pan and waste of food caused by the chickens not being able to reach it is overcome. The cover 2 is also rectangular in shape and has a length and width corresponding to the open upper end of the pan. Therefore, the cover will extend over the entire pan and if the chickens stand or roost upon the cover, they cannot drop dirt down into the pan and thus spoil the food placed in the pan. This cover 2 is provided with depending end walls which fit into the end portions of the pan and are of such width that they will fit snugly within the pan. The cover is shown as made of wood but it may be metal or other material and the end walls are preferably formed of strips of wood and therefore they can be put in the pan without having any bad effect upon the sour milk contained in the pan. It should be further noted that these end walls form very firm supporting means for the cover but at the same time permit the cover to be very readily removed and the cover and pan thoroughly cleaned. In order to prevent the chickens from stepping into the pan but at the same time permit them to have ready access to the food placed in the pan, there have been provided guards 4 which are formed of wire and are U- shaped as shown clearly in Fig. 1. These guards are secured against the side edges of the cover 2 by staples or other suitable fasteners 5 and these guards have their arms extending downwardly and terminating close to the upper edges of the side walls of the pan 1. Therefore, the chickens can readily pass their heads between the depending arms of the guards in order to reach the sour milk or other food placed in the pan but cannot step into the pan. If the chickens step into the pan, they will not only get dirt into the food placed in the pan but in addition will get their feet wet. Wetting of the feet is very injurious to small chickens.

In Figure 4, there has been shown a modified form of guard. In this form, a continuous length of wire has been bent to provide vertically disposed arms 6 and upper and lower arms 7 which connect the vertically disposed arms. The fasteners 5 engage this guard when driven into the edges of the cover and the guard operates in the same manner as that shown in Fig. 1.

When this feeder is in use, the sour milk or other food can be poured into the pan and the cover then put in place as shown. The feeder can then be placed where the chickens are kept and they can have ready access to the sour milk. After the food has been consumed, the feeder can be removed and with the cover removed from the pan, the cover and pan can be thoroughly cleaned and the pan then refilled or put away until it is again to be used. By having the pan formed of aluminum, the chemical action referred to will be prevented and the food prevented from being spoiled by this chemical reaction. As previously stated, the chickens may walk upon the cover or roost thereon if they so desire but they can not drop dirt into the pan and thus cause spoiling of the food. There has thus been provided a chicken feeder which is cheap to produce and efficient in operation.

I claim:

1. A chicken feeder comprising a pan open at its upper end, a cover of the same length and width as said pan positioned above the pan and having depending end walls fitting snugly into the end portions of said pan and held therein by frictional engagement with the walls of the pan and vertically disposed guards extending between the sides of the cover and upper edges of the side walls of said pan.

2. A chicken feeder comprising a rectangular pan open at its upper end, a cover for said pan of the same length and width as the pan and having depending end walls extending downwardly into the end portions of the pan and having frictional engagement with the side walls of the pan, and U-shaped guards secured against the side edges of the cover and having their arms extending downwardly and terminating adjacent the upper edges of the side walls of the pan.

In testimony whereof I have hereunto affixed my signature.

GEORGE H. ALLEN.